United States Patent [19]

Williams et al.

[11] Patent Number: 5,383,089
[45] Date of Patent: Jan. 17, 1995

[54] MIXED-VALENCE COMPLEX ELECTRODES FOR A RECHARGEABLE ELECTRICAL ENERGY STORAGE DEVICE

[75] Inventors: Melanie Williams, Deerfield Beach; James L. Davis, Coral Springs, both of Fla.

[73] Assignee: Motorola, Inc., Schaumburg, Ill.

[21] Appl. No.: 58,849

[22] Filed: May 10, 1993

[51] Int. Cl.$^6$ .............................................. H01G 9/00
[52] U.S. Cl. ................................................... 361/502
[58] Field of Search ...................... 361/502; 29/25.03; 429/210, 246; 204/254, 268, 294, 296

[56] References Cited

PUBLICATIONS

"Chemical And Spectroscopic Characterization Of Cis–Diammineplatinum α–Pyridone Blue In Aqueous Solution. Comparison With Other Platinum Blues" by Jacqueline K. Barton, Carl Caravana And Stephen J. Lippard, contributed from Department of Chemistry, Columbia University, New York, N.Y. 10027, received Jun. 8, 1979, reprinted by the American Chemical Society, 1979.

"New Chemistry of an Old Molecule, etc." by Stephen J. Lippard, Science, 10 Dec. 1982, vol. 218, No. 4577.

Primary Examiner—Bruce A. Reynolds
Assistant Examiner—Michael D. Switzer
Attorney, Agent, or Firm—Dale W. Dorinski

[57] ABSTRACT

An electrode for a rechargeable electrical energy storage device has a substrate and an electrochemically active material deposited on the substrate. The electrochemically active material provides electron transfer between itself and an electrolyte. The electrochemically active material is a mixed-valence complex containing at least two metal atoms and at least one ligand attached to the metal atoms, and has metal-to-metal bonds where the metals exist in multiple oxidation states such that electron transfer between the metal atoms in the complex or between discrete complexes occurs. A rechargeable electrical energy storage device (20) has two electrodes (28, 36) constructed from a mixed-valence complex (30), and the electrodes are electrically connected by an ion carrying electrolyte (32). The electrodes are also physically separated from each other by a barrier (34) that will pass ions but not electrons.

19 Claims, 5 Drawing Sheets (a)

| COMPLEX | Pt VALENCE | Pt-Pt (Å) | COLOR | CONDUCTIVITY ($\Omega^{-1}cm^{-1}$) |
|---|---|---|---|---|
| Pt metal | 0 | 2.775 | METALLIC | ~9.4×10$^4$ |
| $K_2[Pt(CN)_4]\cdot 3H_2O$ | +2.0 | 3.48 | WHITE | 5×10$^{-7}$ |
| $K_2[Pt(CN)_4]Br_{0.3}\cdot 3H_2O$ | +2.3 | 2.88 | BRONZE | 4-830 |
| $K_2[Pt(CN)_4]Cl_{0.3}\cdot 3H_2O$ | +2.3 | 2.87 | BRONZE | ~200 |
| $K_{1.75}[Pt(CN)_4]\cdot 1.5H_2O$ | +2.25 | 2.96 | BRONZE | ~70-100 |
| $Cs_2[Pt(CN)_4](FHF)_{0.39}$ | +2.39 | 2.83 | GOLD | UNKNOWN |

MIXED-VALENCE COMPLEX ELECTRODES FOR A RECHARGEABLE ELECTRICAL ENERGY STORAGE DEVICE

CROSS REFERENCE TO RELATED APPLICATIONS

This application is related to application Ser. No. 7/937,776 filed Sep. 1, 1992, and assigned to Motorola, Inc.

TECHNICAL FIELD

This invention relates generally to energy storage devices, and more particularly to energy storage devices employing electrodes made from mixed-valence complexes.

BACKGROUND

The history of electrochemical energy storage devices, especially capacitors and batteries, has involved attempts to reduce package size while increasing the electrical energy storage capacity. Recent advances in battery design have increased life, efficiency and energy density by making improved lead-acid, nickel-cadmium, nickel-zinc and various primary cells. However, although many of the devices embracing the recent technological advances have filled a need, there continues to be a requirement for efficient, high power density electrical storage devices which withstand the rigors of continuous use and virtually unlimited cycling.

Ultracapacitors and supercapacitors are a new breed of energy storage devices that are completely distinctive from batteries. These devices are true capacitors in that energy is stored by the separation of positive and negative charges. However, unlike traditional parallel plate capacitors, these capacitors store charge at the atomic level between the electrode and the electrolyte. This charge storage mechanism is highly efficient and can produce high capacitances up to several hundred Farads in a compact package. These capacitors are available in two basic varieties depending on the composition of the electrodes. Supercapacitors use activated carbon as the electrode element. While this material is inexpensive, the high internal resistance of the activated carbon limits the power available from the storage device. An alternative technology is to use electrodes composed of one or more oxides of ruthenium, tantalum, rhodium, iridium, cobalt, nickel, molybdenum, tungsten or vanadium deposited on a metal foil. Devices made using these materials for electrodes are known as "ultracapacitors" or "pseudocapacitors", and are described in further detail in Canadian Patent 1,270,296, incorporated herein by reference. Although these devices have much lower internal resistance and hence, higher power densities than carbon-based supercapacitors, the materials used are very expensive. Consequently, construction of the precious metal ultracapacitors can cost several hundred dollars each.

Ultracapacitors store energy by two processes which are shown in FIG. 1. The first is the separation of positive and negative charges at the interface between the electrode and the electrolyte. This phenomenon is called double layer capacitance. The electrical double layer is present at virtually all interfaces between electrodes and electrolytes and is a fundamental property of electrochemical systems. The double layer consists of sorbed ions 12 that are specifically sorbed on the electrode 10 from solution as well as solvated ions 14. The proximity between the electrode 10 and solvated ions 14 is limited by the presence of the solvation sheath 16 around the ions, hence, the solvated ions cannot sorb on the electrode and only approach to some distance d. Therefore, in the case of these solvated ions 14, there exists positive and negative charges separated by a distance d (see FIG. 1), which produce a true capacitance in the electrical sense. The second charge storage mechanism is the sorption of ions on the surface of the electrode. This phenomenon is called pseudocapacitance. The key point to note is that pseudocapacitance is not an electrostatic capacitance like that of the double layer or such as occurring in a parallel plate capacitor. Hence, the term "pseudo" (meaning false) capacitance. Instead, pseudocapacitance is merely a convenient formalism used to express the phenomenon of ion adsorption on electrodes, since the electrical response arising from ion sorption mimics an electrical capacitance. Carbon based supercapacitors rely primarily on the double layer capacitance effect for charge storage, while pseudocapacitors rely on both pseudocapacitance and double layer capacitance. As discussed above, both of these processes are surface phenomena and are highly reversible. The physical processes involved in energy storage in a supercapacitor or ultracapacitor are distinctly different from the bulk phase electrochemical oxidation/reduction processes responsible for charge storage in batteries. Hence, these devices represent a class of energy storage materials completely separate from batteries.

The pseudocapacitance in ultracapacitors fabricated from $RuO_x$ and similar metal oxides is due to the following surface reactions which produces a redox couple:

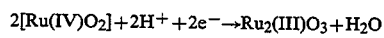

$$2[Ru(IV)O_2] + 2H^+ + 2e^- \rightarrow Ru_2(III)O_3 + H_2O$$

Capacitance is generated through the adsorption of protons on the surface, migration of protons into the oxide lattice, and proton and electron hopping throughout the lattice to produce the above redox reactions. It is thought that the interaction effect between the redox couples spreads the reversible current response over a larger potential range than that which might otherwise arise for two separate redox systems.

Clearly, a need exists for an electrical energy storage device that combines the desirable features of precious metal ultracapacitors and conventional electrochemical batteries, yet can be manufactured at a reasonable cost.

SUMMARY OF THE INVENTION

Briefly, according to the invention, there is provided an electrode for a rechargeable electrical energy storage device. The electrode comprises a substrate and an electrochemically active material deposited on the substrate. The electrochemically active material provides electron transfer between itself and an electrolyte. The electrochemically active material is a mixed-valence complex containing at least two metal atoms and at least one ligand attached to the metal atoms, and has metal-to-metal bonds where the metal atoms exist in multiple oxidation states such that electron delocalization or transfer can occur between atoms in the complex or between discrete complexes.

Another embodiment of the invention comprises a rechargeable electrical energy storage device, having two electrodes, at least one electrode being a mixed-valence complex. The mixed-valence complex contains at least two metal atoms and at least one ligand attached to the metal atoms, and having metal-to-metal bonds where the metals exist in multiple oxidation states such that electron delocalization or electron transfer can occur between atoms in the complex or between discrete complexes. An ion carrying medium electrically connects and physically separates the electrodes.

BRIEF DESCRIPTION OF THE DRAWINGS

FIG. 8 is a table of properties of useful mixed-valence complexes in accordance with the invention.

DETAILED DESCRIPTION OF THE PREFERRED EMBODIMENT

Figure 1:
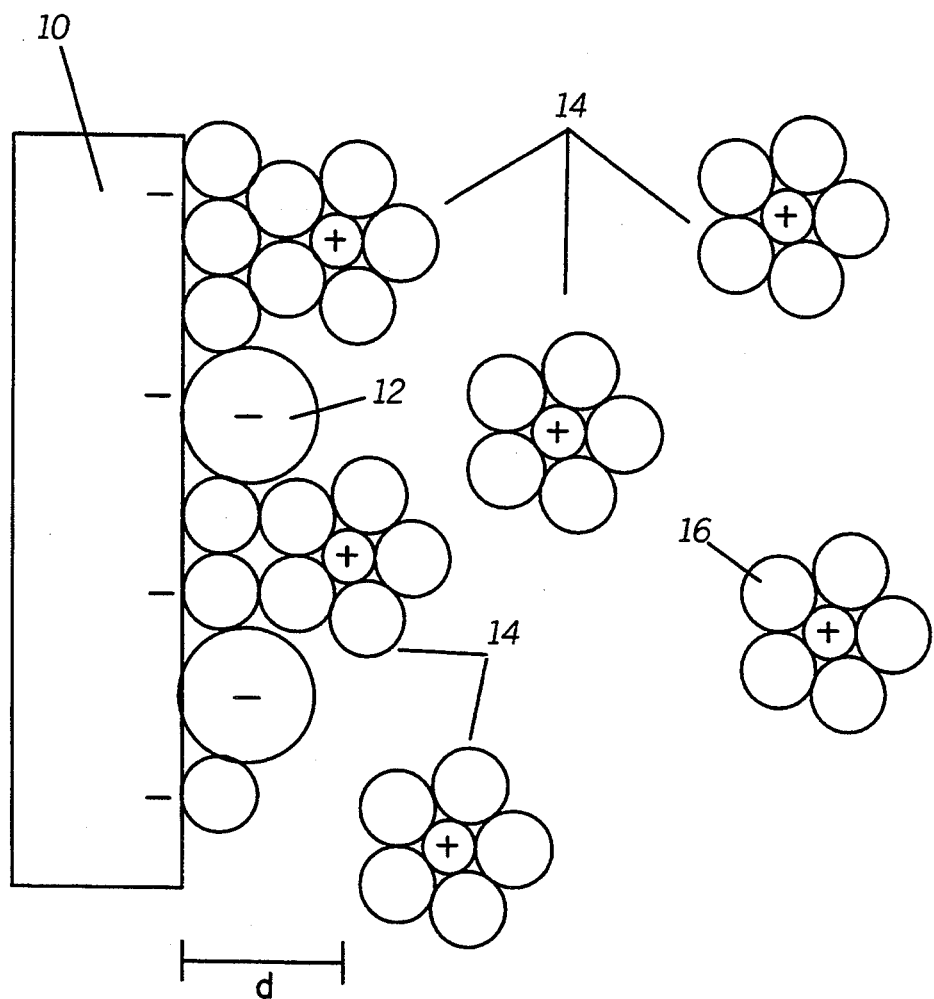
FIG. 1 is a schematic representation of double layer capacitance.

This invention describes the use of mixed-valence complexes as electrodes for ultracapacitors. The main criteria for selection of an appropriate pseudocapacitive couple are 1) an active electrode material which can be prepared in a stable, high surface area form, and 2) the potential for reversible and largely voltage independent, surface or near surface charge transfer reactions. These criteria characterize two distinctive properties of electrode materials in electrochemical capacitors: the capability to undergo acid/base or redox reactions and a porous morphology which produces a high surface area. This can be illustrated by referring to the mechanism for pseudocapacitance generated from the rare earth oxides as described in Canadian Patent 1,270,269. Consideration of the pseudocapacitive mechanism suggests that an alternative class of materials which have potential as electrode materials in electrochemical capacitors are mixed-valence organometallic complexes having organic or inorganic ligands. A ligand is a molecular bound to a central atom in a coordination compound, for example the ammonia molecules in $[Co(NH_3)_6]^{3+}$. Mixed-valence complexes contain metal-to-metal bonds where the metal atoms exist in multiple oxidation states. The formal oxidation state of the metal in these complexes is often non-integral, (for example, 2.5 in cis-diammineplatinum alpha pyridone blue). An additional characteristic of these complexes is that they are generally amorphous dimmers, oligomers, or polymers rather than simple monomeric coordination complexes.

Examples of mixed-valence complexes of transition metals are now described. One class of useful mixed-valence complexes, the "platinum blues", provides an illustrative example of the structure and chemistry of mixed-valence complexes. These complexes are produced from the reaction of a platinum-complex anion with a primary amide. In contrast to classical platinum coordination complexes which are typically yellow or white in color, the platinum blues are literally blue. The formal oxidation state of the metal in the platinum blues is generally non-integral and between two and four, whereas integral oxidation states of two or four are typically encountered in conventional platinum coordination chemistry. Other mixed-valence complexes also exhibit unusual colors such as greens, reds, purples, and blacks. The platinum blues have been described in the literature by Stephen J. Lippard (*Journal of the American Chemical Society*, Nov. 21, 1979, Vol. 101, No. 24., pp. 7269–7277) and others.

Some mixed-valence platinum complexes have been shown to undergo quasi-reversible to reversible electron transfer reactions as a consequence of redox equilibria. The redox equilibria for cis-diammineplatinum alpha pyridone blue upon addition of anions is shown below:

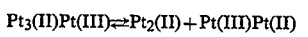

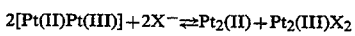

The Pt dimmers thus formed in this reaction can undergo two electron transfer reactions as shown below:

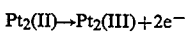

Controlled potential electrolysis studies have confirmed the chemical reversibility of the redox reaction for this complex. The reversibility of the electron transfer process in the mixed-valence complexes makes them suitable for use as electrode materials in batteries or ultracapacitor devices.

Figure 2:
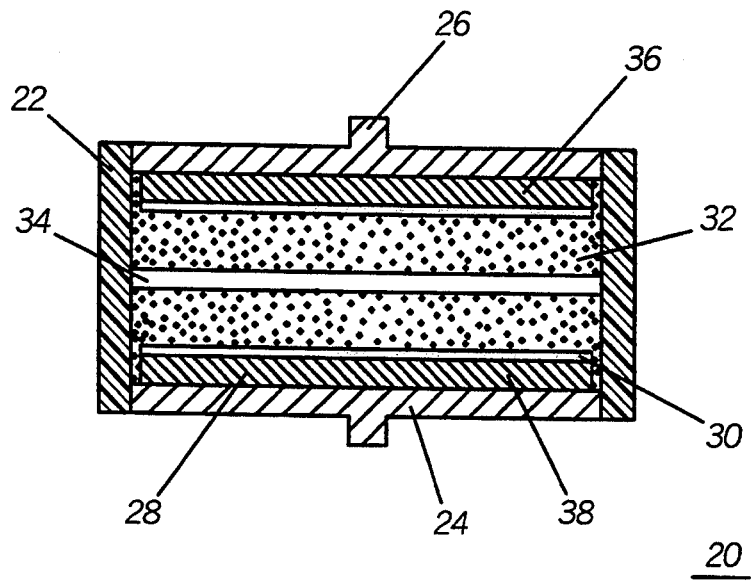
FIG. 2 is a cross-sectional view of an electrical energy storage device in accordance with the invention.

A description of the invention is now presented and is best understood from a consideration of the following text in conjunction with the drawing figures, in which like reference numerals are carried forward. Referring now to FIG. 2, an energy storage device 20 is constructed in a housing 22. The housing 22 is typically a cylinder with openings at opposite ends but may be other shapes as desired by the individual designer, for example, cubes or rectangular solids. One end of the housing 22 has a first metal connector 24 inserted therein to provide an electrical contact to the energy storage device. The opening at the opposite end of the housing 22 has a second metal connector 26 provided for a likewise purpose. The material employed for the housing 22 is a non conductive or dielectric material, for example, polyvinyl chloride, nylon, polyethylene, polypropylene, or other non conductive materials. A first electrode 28 is formed by depositing a mixed-valence complex 30 on a substrate 38. An electrolyte 32 is used as an ion conducting medium. The electrode 28 is then placed into the housing 22. Mixed-valence complexes of interest in the production of the device are materials such as:

"platinum blues", specifically, cis-diammineplatinum alpha pyridone blue;

Pt-Uracil complexes that are reaction products of L-asparginine, l-glutamine, alpha pyridone, uracil, cytosine, or thymine with the tetrachloroplatinate ion;

reaction products of the squarate ion with hexahydroxyplatinum (IV) or tetra-aquaplatinum (II);

mixed-valence platinum and palladium complexes where metal atoms in different oxidation states are bridged by halide atoms, such as Wolfram's red salt;

tetracyanoplatinate complexes with stacked anions, typically one dimensional solids having planar complexes arranged in stacks in the crystal where there is direct bonding between the metal atoms so that a one-dimensional metal can be formed if the metal atoms can sufficiently approach each other, for example, complexes of the tetracyanoplatinate ion when the substances contain 0.3 Cl or 0.3 Br (known as Krogmann salts); and planar or non-planar complexes arranged in stacks to give infinite chains of metal atoms.

Figure 5:
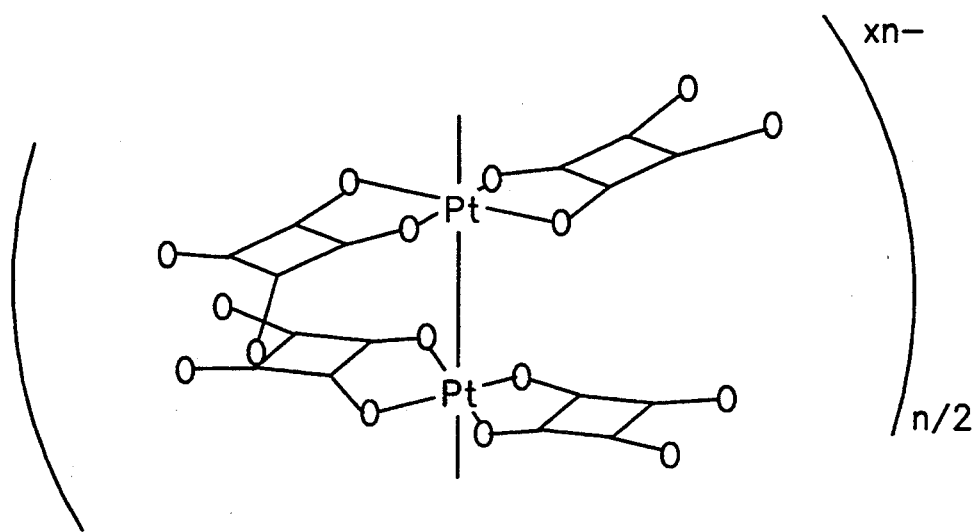
FIGS. 3–7 are structural formulas of useful mixed-valence complexes in accordance with the invention.
Figure 3:
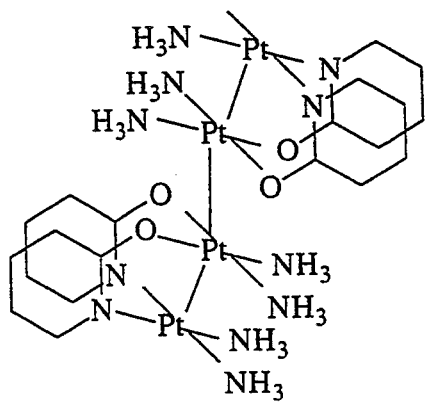
Figure 4:
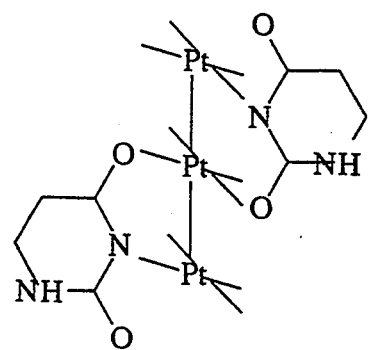
Figure 4:
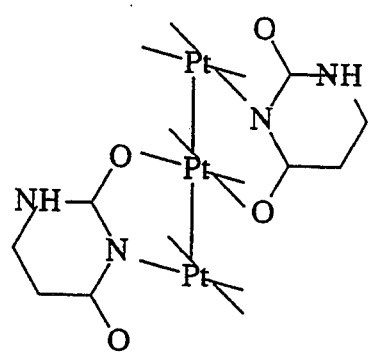
Figure 4:
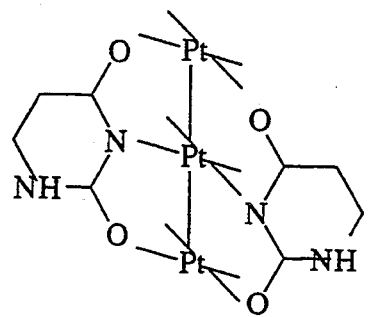
Figure 6:
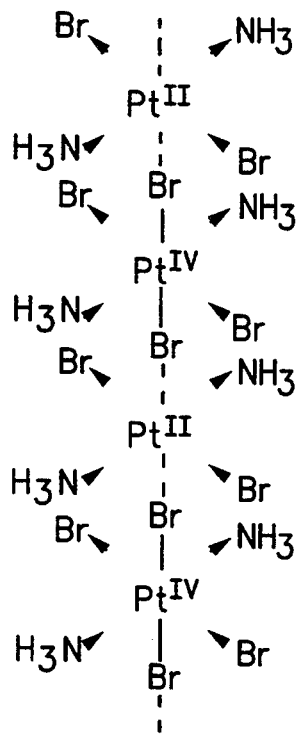
Figure 7:
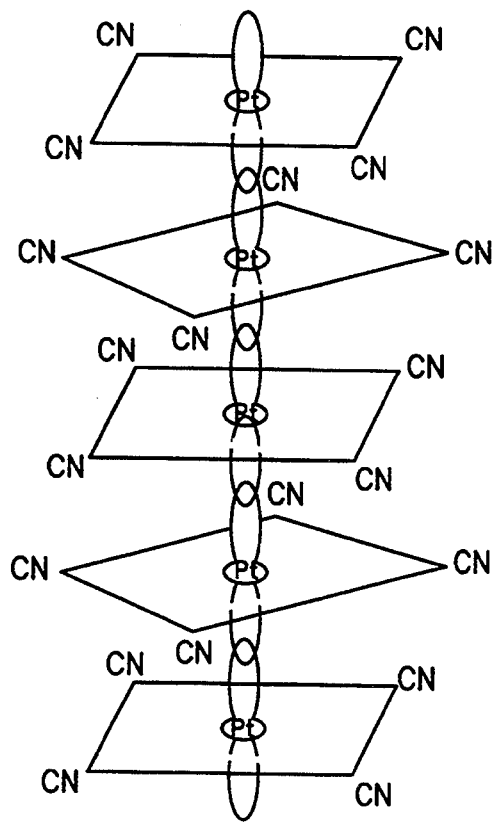

Other complexes having similar properties and constructions may be apparent to the reader and still fall within the scope of the invention. Cis-diammineplatinum alpha pyridone blue is produced from the reaction of alpha pyridone with the controlled hydrolysis products of cis-DDP. The structure of this complex is shown in FIG. 3. This structure reveals a dimeric Pt-Pt tetranuclear complex with head-to-head bridged fragments. The average oxidation state of platinum in this complex is 2.25, corresponding to the presence of three platinum (II) atoms and one platinum (III) atom in the cation. The single unpaired electron is fully delocalized over the four platinum atoms in the complex. The unusual color of the mixed-valence complexes is due to electronic transitions of an electron from a filled sigma molecular orbital into a half filled antibonding sigma orbital oriented along the platinum chain z axis containing a single unpaired electron. The electronic structure (giving rise to the unusual color) of these complexes is related to the degree of Pt-Pt bonding. L-aspargine, l-glutamine, alpha pyridone, uracil, cytosine, and thymine all react with the tetrachloroplatinate ion or other platinate ions to produce blue complexes which are considered "platinum blues". Several proposed structures for the Pt-uracil complexes are shown in FIG. 4. Reaction of the squarate ion with hexahydroxyplatinum (IV) or tetra-aquaplatinum (II) yields a mixed-valence complex in which platinum exists in a formal oxidation state of 2.4. The electrical conductivity of this complex approaches that of a metallic state, and the black crystals formed show a large optical anisotropy, and a large anisotropy in the conductivity. The structure of this complex is shown in FIG. 5. Another class of mixed-valence platinum and palladium complexes exist where metal atoms in different oxidation states are bridged by halide atoms. An illustrative example, known as Wolfram's red salt, is illustrated in FIG. 6. One-dimensional solids are planar complexes arranged in stacks in the crystal where there is direct bonding between the metal atoms so that a one-dimensional metal can be formed if the metal atoms can sufficiently approach each other, as shown in FIG. 8. The known complexes typically contain platinum or iridium atoms in non-integral oxidation states (ranging between two and three), are bronze to black in color, and exhibit conductivities approaching that of electrical conductors. The non-integral oxidation state is accompanied by a large decrease in the stacking distance, so that the Pt-Pt bond distance approaches that of metallic platinum. Complexes of the tetracyanoplatinate ion (shown in FIG. 7) are known as Krogmann salts when the substances contain 0.3 Cl or 0.3 Br in the crystal. Additional one-dimensional tetracyano complexes are listed in FIG. 8.

Other classes of useful complexes have two or more Ru atoms bridged by bidentate ligands, such as the Creutz-Taube complex, where ruthenium exists as a mixed valence ($Ru^{II}$–$Ru^{III}$) species. Ruthenium ammine complexes, the 'Ruthenium Reds' exist as mixed-valence, highly colored red or brown complexes which also possess useful mixed-valence properties. Iron complexes, such as Prussian Blue and Turnbull's Blue [iron (III) hexacyanoferrate(II)], as well as mixed valence complexes of tungsten, molybdenum and rhodium can also be employed in this invention.

In the preferred embodiment of the invention, the mixed-valence complex is cis-diammineplatinum alpha pyridone blue. A separator 34, which is composed of a dielectric material which will pass ions but not electrons, is then placed between the first electrode 28 and a second electrode 36. The separator material 34 provides a barrier between the first electrode and the second electrode and is typically an ion permeable membrane such as hydrophilic plastic films, glass, papers, felt, cellulose materials, gels, porous plastics, ion exchange films, screens, beads, etc. The second electrode 36 is now formed in a manner similar to the first electrode and placed inside the housing directly on top of the separator 34. The second metal connector 26 is now sealed into the housing to provide an energy storage device 20. 'Electrolytes' or ion-conducting mediums used for the energy storage device may be a number of aqueous or non-aqueous systems, such as water, acids, bases, or salts and solutions thereof. Because the mixed-valence materials used for both electrodes may be similar, either the first metal connector 24 or the second metal connector 26 may serve as the positive or negative connection of the electrical energy storage device, depending upon how connections are made when the device is charged.

It should now be apparent to the reader that the instant invention combines the advantages found in capacitors with those found in batteries but is constructed in a manner unlike either. The ion path between the anode and the cathode is via an electrolyte through a separator. The electrolyte may be solid or liquid, aqueous or nonaqueous. In keeping with the terminology used in the battery industry, the negative electrode is also known as the anode and the positive electrode is also known as the cathode. Electrons move from the negative to the positive by an external circuit during the work.

In order to provide a useful electrical energy storage device, the storage device 20 must be charged. This is performed by imparting an electrical potential across the electrical connectors 24 and 26 and maintaining the potential on the device 20 until a desired state of charge is obtained. During use, the cell is discharged by connecting the electrical connectors 24 and 26 to an electrical device such as a portable radio, an electric motor, light emitting diode, or other electrical device. Because the electrical energy storage device herein described is not a primary cell but can be recharged, the process of charging and discharging may be repeated over and over, creating a rechargeable cell. That is, after discharging the storage device by powering an electrical device, the storage device may be recharged by reapplying the potential to the connectors, and then discharged again. Another embodiment is to deposit the mixed-valence electrode material on a base metal such as titanium or iron. The device can also consist of mixed electrodes containing the mixed-valence complex(s) and/or other substances such as metal oxides, metal sulfides, and metal phosphates.

The electrical energy storage device herein described will find numerous uses, among them, a power source or battery for portable radios or other portable electrical devices. This device combines the desirable features of precious metal ultracapacitors and conventional electrochemical batteries at a reasonable cost.

While the preferred embodiments of the invention have been illustrated and described, it will be clear that the invention is not so limited. Numerous modifications, changes, variations, substitutions and equivalents will readily occur to those skilled in the art without departing from the spirit and scope of the present invention.

What is claimed is:

1. An electrode for a rechargeable electrical energy storage device, comprising:
   a substrate;
   an electrochemically active material deposited on the substrate, the electrochemically active material providing electron transfer between itself and an electrolyte; and
   the electrochemically active material comprising a mixed-valence complex containing at least two metal atoms and at least one ligand attached to the metal atoms, and having metal-to-metal bonds where the metal atoms exist in multiple oxidation states such that electron delocalization or transfer between atoms in the complex or between discrete complexes can occur.

2. The electrode for a rechargeable electrical energy storage device as described in claim 1, wherein the at least two metal atoms comprise different metals.

3. The electrode for a rechargeable electrical energy storage device as described in claim 1, wherein the formal oxidation state of the metal in the complex is non-integral.

4. The electrode for a rechargeable electrical energy storage device as described in claim 1, wherein the mixed-valence complex is a salt.

5. The electrode for a rechargeable electrical energy storage device as described in claim 1, further comprising more than one mixed valence complex per electrode.

6. The electrode for a rechargeable electrical energy storage device as described in claim 1, wherein the mixed-valence complex is selected from the group consisting of platinum blues, platinum reds, platinum greens, and platinum purples.

7. The electrode for a rechargeable electrical energy storage device as described in claim 6, wherein the mixed-valence complex is cis-diammineplatinum alpha pyridone blue.

8. The electrode for a rechargeable electrical energy storage device as described in claim 1, wherein the mixed-valence complex is tetracyanoplatinate complexes with stacked anions.

9. A rechargeable electrical energy storage device, comprising;
   an electrochemical cell having two electrodes, at least one electrode comprising a mixed-valence complex containing at least two metal atoms and at least one ligand attached to the metal atoms, and having metal-to-metal bonds where the metals exist in multiple oxidation states such that electron delocalization or transfer between the metal atoms in the complex or between discrete complexes occurs; and
   an ion carrying medium electrically connecting and physically separating the electrodes.

10. The rechargeable electrical energy storage device as described in claim 9, wherein either of the two electrodes may be the anode or negative electrode.

11. The rechargeable electrical energy storage device as described in claim 9, wherein either of the electrodes may be the cathode or positive electrode.

12. The rechargeable electrical energy storage device as described in claim 9, wherein the mixed-valence complex is selected from the group consisting of platinum blues, platinum reds, platinum greens, and platinum purples.

13. The rechargeable electrical energy storage device as described in claim 12, wherein the mixed-valence complex is cis-diammineplatinum alpha pyridone blue.

14. The rechargeable electrical energy storage device as described in claim 9, wherein the mixed-valence complex is tetracyanoplatinate complexes with stacked anions.

15. The rechargeable electrical energy storage device as described in claim 9, further comprising a current collector, wherein the current collector is coated with the mixed-valence complex.

16. The rechargeable electrical energy storage device as described in claim 9, wherein the formal oxidation state of the metal in the complex is non-integral.

17. The rechargeable electrical energy storage device as described in claim 9, wherein each electrode comprises a different mixed-valence complex.

18. An electrical energy storage device comprising:
   a rechargeable electrochemical cell having two electrodes and an electrolyte, at least one of the electrodes having a surface comprising an electrochemically active material that provides electron delocalization or transfer between the electrolyte and the electrochemically active material;
   the electrodes separated by a barrier that passes ions but not electrons; and
   the electrochemically active material comprising one or more mixed-valence complexes containing at least two metal atoms and at least one ligand attached to the metal atoms, and having metal-to-metal bonds where the metals exist in multiple oxidation states such that electron transfer between atoms in the complex or between discrete complexes can occur.

19. The electrical energy storage device as described in claim 18, wherein the formal oxidation state of the metal in the complex is non-integral.

* * * * *